UNITED STATES PATENT OFFICE.

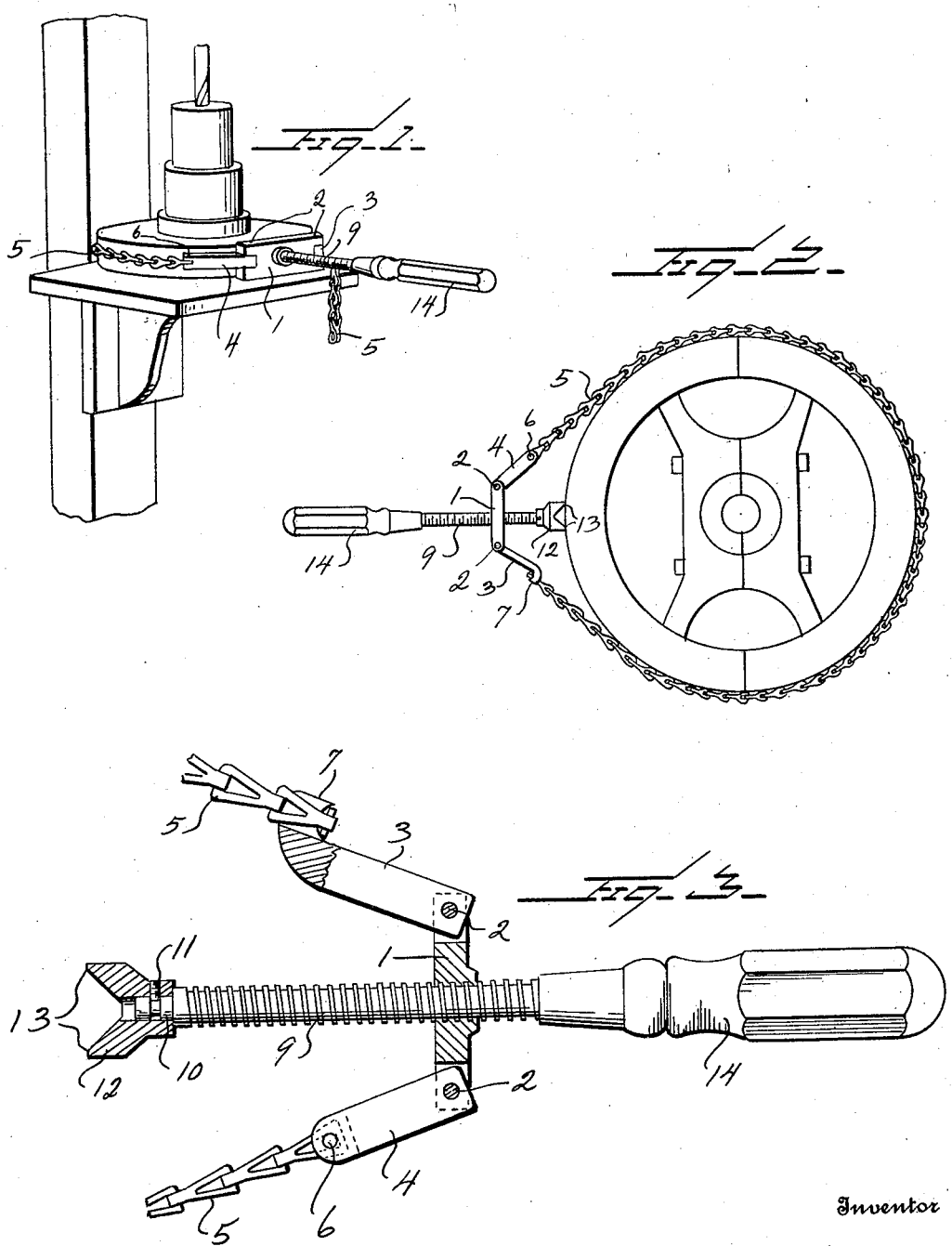

JOHN HENRY RYAN, OF BRIGHTON, MASSACHUSETTS.

CHAIN CLAMP.

1,399,885.  Specification of Letters Patent.  Patented Dec. 13, 1921.

Application filed March 2, 1921. Serial No. 449,142.

*To all whom it may concern:*

Be it known that I, JOHN H. RYAN, a citizen of the United States, residing at Brighton, in the county of Suffolk and State of Massachusetts, have invented certain new and useful Improvements in Chain Clamps, of which the following is a specification, reference being had to the accompanying drawings.

In carpenter and machine shops, as well as in automobile garages and repair establishments, there are a great many objects to be clamped and held in a firm position for various repairs, or when being drilled.

Therefore, it is the purpose to provide a device of the present character, to be used for removing pulleys and detaching counter or line shafts, or hanging countershafts, pulling off automobile wheels, as well as performing other functions.

Heretofore it has been found tedious and tiresome for holding certain objects by the hands in all shops where mechanical work is done, therefore, it is still another purpose to provide an improved work holder as a new article of manufacture, in order to facilitate all classes of mechanical repairing. Also the present chain clamp has been found useful in larger lines of work, such as setting up counter shafts, pulleys and the like, while the work is being repaired, or during the course of construction. The present form of chain clamp may be used for numerous other purposes, and also for holding castings, and also for holding motor blocks, in fact for holding anything, whether it is rectangular, round or otherwise shaped.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view illustrating the clamp adapted for holding a pulley, while being drilled.

Fig. 2 is a view of the chain clamp as engaged with the pulley, which is disposed in another position.

Fig. 3 is an enlarged detail view of the chain clamp.

Referring to the drawings, 1 designates the head of the clamp, and pivoted to its ends as at 2 are link jaws 3 and 4, which are employed for connecting the clamping chain to the head of the clamp. The jaw 4 has one end of the clamping chain 5 connected permanently as at 6. The other link jaw 3 terminates in a hook 7, which may be engaged by any one of the links of the chain clamp, so that the clamp may be adjusted, in order to accommodate itself to various forms of work, in various mechanical and electrical repair shops, say for instance pulleys, motor blocks, shafts, in fact any form of work, which is not of a character that can be handled by the hands, or vises, or by special work holders now in use in such shops.

The chain clamp may be any suitable length, and if necessary it can be constructed in sections, so that the chain clamp can be lengthened or shortened, for the purpose of holding large and small objects. It is also possible that the chain clamp may be any length, for holding large pieces or parts for repair. The chain may be passed about the work, either making one or two wrappings in the same direction, or in opposite directions, or at right angles, so as to facilitate holding the work firm, and in proper position to be repaired, or constructed.

The head 1 has a threaded opening, through which an elongated screw 9 is threaded. One end of the screw is reduced as at 10, and swiveled to the reduced extension as at 11 is a work engaging foot 12. This foot has a V-shaped recess, therefore the shoe is caused to be formed with V-shaped toes 13, which bind into the work to be clamped. Obviously by turning the screw, the swiveled end of the screw will operate in the shoe, the shoe will remain stationary, owing to the V-shaped toes (which are sharp) binding into the surface of the work and preventing slipping. The other end of the screw terminates in a handle 14, which may be grasped, for turning the screw in order to tighten up the clamp on the work to be held.

In using the clamp, it is obvious that the chain is first passed about the work, as shown clearly in Figs. 1 and 2, and then any one of the links of the chain clamp is engaged with the hooked end by one of the link jaws of the head, the chain clamp is then tightened about the work, by turning the screw, the shoe binding into the work to prevent slipping of the entire clamp while being adjusted to the work, after which the object to be repaired may be held in different positions, such as shown in Figs. 1 and 2. The chain clamp may be constructed in sections, and in this case the sections may be detachably united, so that the chain may be lengthened or shortened, for large or small work. When the clamp is applied the work may be held firm and rigid, either while being drilled, or while being handled in the forge or on the anvil, or while being otherwise repaired.

The invention having been set forth, what is claimed as being useful is:

1. In a device for the purpose indicated, a head, a link jaw connected to one end of the head, a link jaw connected to the opposite end of the head and provided with a hook, a flexible clamp connected to the first link jaw and passing about the work to be clamped and having its other end adapted to detachably engage said hook, and means adjustable through the head and bearing upon the work, for drawing the flexible clamp taut.

2. In a device for the purpose indicated, a head, a link jaw connected to one end of the head, a link jaw connected to the opposite end of the head and provided with a hook, a flexible clamp connected to the first link jaw and passing about the work to be clamped and having its other end adapted to detachably engage said hook, and a screw adjustably passing through the head and having a swiveled shoe to bind upon the work, whereby, upon rotating the screw in a required direction, the flexible clamp may be drawn taut about the work.

In testimony whereof I hereunto affix my signature.

JOHN HENRY RYAN.